United States Patent [19]

Wilson

[11] 4,426,995

[45] Jan. 24, 1984

[54] SOLAR QUILT

[75] Inventor: Gerald E. Wilson, London, Canada

[73] Assignee: Carpools Environmental Protection Services Ltd., London, Canada

[21] Appl. No.: 311,202

[22] Filed: Oct. 14, 1981

Related U.S. Application Data

[63] Continuation-in-part of Ser. No. 964,413, Nov. 28, 1978, abandoned.

[30] Foreign Application Priority Data

Sep. 1, 1978 [CA] Canada .................................. 310531

[51] Int. Cl.³ .............................................. F23J 3/02
[52] U.S. Cl. .................................... 126/426; 126/415; 126/417; 126/450; 4/493; 4/498; 4/499; 47/27
[58] Field of Search .............. 126/415, 416, 426, 450, 126/449, 441; 4/498, 499, 502, 493; 47/9, 27, 2, 32

[56] References Cited

U.S. PATENT DOCUMENTS

| | | | |
|---|---|---|---|
| 2,940,219 | 6/1960 | Schiller | 47/27 |
| 3,072,920 | 1/1963 | Yellot | 126/415 |
| 3,315,408 | 4/1967 | Fisher | 47/9 |
| 3,341,318 | 9/1967 | Chilton | 47/9 |
| 3,493,464 | 2/1970 | Bowers | 47/9 |
| 3,949,095 | 4/1976 | Pelehach et al. | 126/415 |
| 3,949,259 | 4/1976 | Kostlin | 126/441 |
| 3,981,293 | 9/1976 | Gillery | 126/441 |
| 3,987,780 | 10/1976 | Nozik et al. | 126/443 |
| 3,998,204 | 12/1976 | Fuchs | 126/415 |
| 4,003,366 | 1/1977 | Lightfoot | 126/449 X |
| 4,019,494 | 4/1977 | Safdari | 126/449 |
| 4,026,268 | 5/1977 | Bartos | 126/445 |
| 4,033,326 | 7/1977 | Leitner | 126/415 |
| 4,059,095 | 11/1977 | Grundmann et al. | 126/426 X |
| 4,060,070 | 11/1977 | Horter | 126/426 X |
| 4,103,368 | 8/1978 | Lockshaw | 126/415 |
| 4,121,567 | 10/1978 | Carson | 126/415 |
| 4,146,015 | 3/1979 | Acker | 126/415 |
| 4,151,954 | 5/1979 | Jacobs | 126/429 X |
| 4,296,741 | 10/1981 | Harder | 126/449 |

FOREIGN PATENT DOCUMENTS

| | | | |
|---|---|---|---|
| 997971 | 10/1976 | Canada . | |
| 2717070 | 11/1977 | Fed. Rep. of Germany | 126/415 |
| 290648 | 6/1965 | Netherlands | 47/27 |

OTHER PUBLICATIONS

Fan, John C. G. and Bachner, Frank J., "Transparent Heat Mirrors for Solar-Energy Applications", Applied Optics, vol. 15, No. 4, Apr. 1976.

*Primary Examiner*—Larry Jones
*Attorney, Agent, or Firm*—Beveridge, DeGrandi & Kline

[57] ABSTRACT

A flexible quilt collects and absorbs solar energy, and transfers heat to the underlying ground, water or other medium. It includes insulating gastight compartments which are located between an upper film and a lower film. The upper film has a high transmissability of ultraviolet and infrared energy directed downwardly therethrough, and it is reflective of infrared energy impinging on its lower surfaces. The lower film is absorbtive of solar energy and is modified to enhance the thermal conductivity through its thickness. To promote heat transfer to the underlying medium, the lower film is deformed to increase its surface area, a plurality of downward projections extending from each area of the lower film associated with each gastight compartment.

6 Claims, 9 Drawing Figures

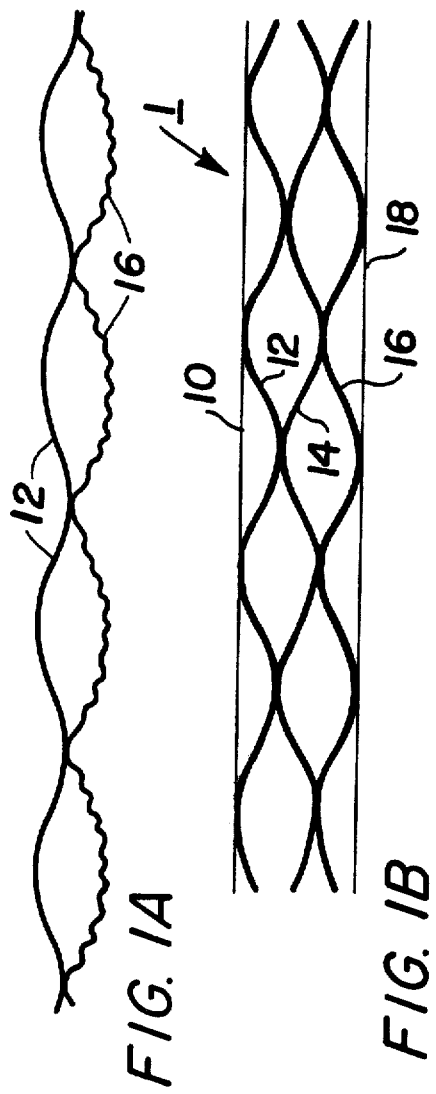
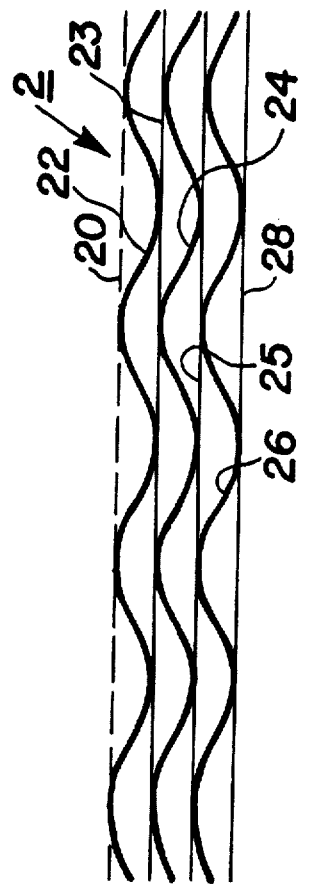
FIG. 1A
FIG. 1B
FIG. 2

SOLAR QUILT

REFERENCE TO RELATED APPLICATION

This is a continuation-in-part of abandoned U.S. patent application Ser. No. 964,413 filed Nov. 28, 1978, for a solar heating device.

BACKGROUND OF THE INVENTION

This invention relates to a solar quilt for heating the ground to lengthen the agricultural growing season, drying fruits in agriculture, heating swimming pools and other liquids, heating building surfaces, heating sewage treatment lagoons, preventing freezing of water in downspouts, gutters and sidewalks and for other industrial and domestic purposes.

It is a feature of one object of the invention to provide a quilt which collects radiant energy and transmits the energy therethrough, but which substantially reduces heat flow in an opposite direction.

It is a feature of another object of the invention to provide a solar quilt suitable for use in heating a swimming pool.

It is a feature of another object of the invention to provide a solar quilt for use in connection with the heating of buildings either directly or in conjunction with heat pumps.

It is a feature of a further object of the invention to provide a solar quilt for raising the temperature of soil and for extending the growing season in agricultural processes, including the drying of produce.

It is a feature of a further object of the invention to provide a solar quilt for use in raising and/or controlling the temperature of sewage lagoons, fishponds, agriculture areas, and similar examples.

SUMMARY OF THE INVENTION

According to the invention, a flexible solar quilt comprises upper and lower films which have therebetween a multiplicity of isolated gastight compartments providing a thermal insulation barrier. The upper film is flexible and clear and it possesses a capability of high ultraviolet and infrared transmission in a downward direction. Further, the upper film includes reflective means for reflecting downwardly infrared energy which impinges on the underside of this film. The lower film is flexible and it has a high light energy absorption capability. The lower film includes an organic polymer and a modifier which provides the lower film, through its thickness, with a higher thermal conductivity than the polymer in order to promote the transfer of heat toward an underlying medium which is to be heated.

Preferably, the downward reflectivity of the upper film is provided by a layer of unidirectional light transmitting material on the lower surface of the upper film. Regarding the lower film, the modifier for enhancing its thermal conductivity may include thermally conductive particles which are dispersed in the organic polymer of the film. The thermal conductivity of the lower film is preferably at least about $10.0 \times 10^{-4}$ calories/second/square centimeter (°C./centimeter).

To increase the efficacy of the heat emitting lower surface of the lower film, it is desirable to form the lower film so its lower surface has an area which is at least about 30% greater than the area of a plane of commensurate lateral dimensions. The formation of the lower sheet may be such that it is provided, in each area thereof associated with each of the isolated gastight compartments, with a plurality of downwardly extending projections.

The invention may also include at least one intermediate film located between the upper and lower films, forming the quilt so that it has at least two layers of the isolated gastight compartments.

The invention may take a wide variety of forms, some examples of which are shown in the accompanying drawings and the following description.

BRIEF DESCRIPTION OF THE DRAWINGS

FIG. 1A is a cross-sectional view of a solar quilt which has sinusoidally-shaped compartments therein and a lower sheet which has supplemental deformations to increase the area of its lower surface.

FIG. 1B is a cross-sectional view of a second embodiment which embodies sinusoidally-shaped compartments, this embodiment having an intermediate film, supplemental upper and lower films, and plural layers of gastight compartments.

FIG. 2 is a cross-sectional view of a further solar quilt which has sinusoidally-shaped compartments.

BRIEF DESCRIPTION OF THE PREFERRED EMBODIMENTS

Figure 3A:
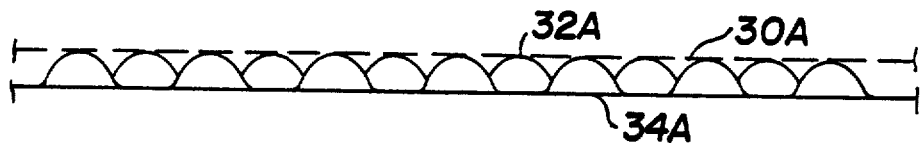
FIGS. 3A, 3B and 3C are cross-sectional views of solar quilts which have semicircular or spherical gastight compartments therein.

FIG. 1A shows a solar quilt which includes flexible upper and lower films 12 and 16. The quilt is flexible so that it may be rolled up for shipment and storage, preferably on large reels provided for such purposes. The upper film 12 is transmissive of downwardly directed solar energy and is reflective of upwardly directed radiant energy in the ultraviolet, visible and infrared frequency ranges. The lower film 16 is absorptive of incident solar energy and it also has a high thermal conductivity which enhances its ability to conduct heat therethrough and into an underlying medium to be heated.

The optically transmissive upper film 12 and the non-optically transmissive lower film 16 abut and are sealed to each other at a multiplicity of separated junction points to form a matrix of isolated gastight compartments. The compartments thus formed inherently give the upper film 12 a sinusoidally undulating non-planar configuration. The upper film 12 has a high ultraviolet and infrared transmission capability, and it is also modified in a manner which causes it to reflect downwardly much of the infrared energy impinging on its underside, thereby contributing to a "greenhouse" effect. Such reflectivity may be achieved by the use of films and coatings which provide unidirectional reflectivity. These films and coatings are well known in the art and are commonly applied to the windows of buildings to deter the entry of solar energy without preventing outward visibility. Mechanical, physical, molecular or chemical modifications of the film may also provide the appropriate reflectivity.

The lower film 16 is preferably opaque, absorptive of solar energy and of relatively high thermal conductivity. Its sinusoidal shape shown in FIG. 1A provides it with a net energy receptive area which is greater than its geometric planar area. On its surface or throughout its thickness, film 16 is provided with a material which will enhance its capability of absorbing solar energy to produce heat. Absorption-enhancing materials are well known and include carbon black, aluminum, copper and metal oxides.

The high thermal conductivity of lower film 16 is quite important so that the heat generated by the incident solar energy will be transmitted readily through the thickness and laterally within this film. Enhanced thermal conductivity and increased specific heat may be achieved by modifying the film physically, mechanically or molecularly. A liquid, powder or film may be laminated to the surface of the lower film 16, and/or metallic particles may be added to the organic polymer of the film to increase its thermal conductivity. Coatings and mixtures of powdered metals and metal oxides, as well as threads, filaments, filings and compounds placed on and/or located within the film, will significantly improve its thermal conductivity. As modified, the film, through its thickness, has a thermal conductivity which is at least about $10.0 \times 10^{-4}$ calories/second/square centimeter/(°C./centimeter) at ambient temperatures.

To increase the efficiency of heat transmission from the lower film 16 to the ground, water or other receiving medium, a feature of the invention is the provision of an increased surface area of the heat-emitting lower surface of the film 16. As shown in FIG. 1A, this increased surface area is produced by deforming the film 16 to provide, in each area thereof which defines a gastight compartment, a plurality of undulations or projections which are sinusoidal in cross section. These projections may be formed in the film 16 by heated dies or rollers, and they may be in the form of dimples, nodules, flutes, striations or other shapes. The peaks of adjacent projections are preferably spaced apart a distance of about one-eighth inch or less, and the surface area of a face of such a deformed lower film is at least 30% greater than the area of a plane of commensurate lateral dimensions.

The modified quilt 1 shown in FIG. 1B includes an intermediate film 14 which provides a second layer of gastight compartments between the upper and lower films 12 and 16. This intermediate film 14 may be the same or similar to the upper film 12. Additionally, the quilt of FIG. 1B is provided with planar external wear-resistant strengthening films 10 and 18 which are resistant to chemical attack and may possess fungicidal and/or bacteriacidal properties. The upper strengthening film 10 is formed of a material which transmits solar energy, and the lower strengthening film 18 has a thermal conductivity which is comparable to that of the film 16. The strengthening films 10 or 18 may also be used in lieu of either or both of the films 12 and 16.

In the embodiment of FIG. 2 the quilt is formed of films 22, 24 and 26 which have characteristics which are comparable to films 12, 14 and 16, respectively. These films 22, 24 and 26 are connected together by their abutment and joined to the intermediate films 23 and 25, with which they form a multiplicity of isolated gastight compartments.

In the embodiment shown in FIG. 3A, the upper film 32A is formed into semihemispherical modules which abut and are sealed to a lower film 34A. An upper strengthening film 30A may be included.

Figure 3B:
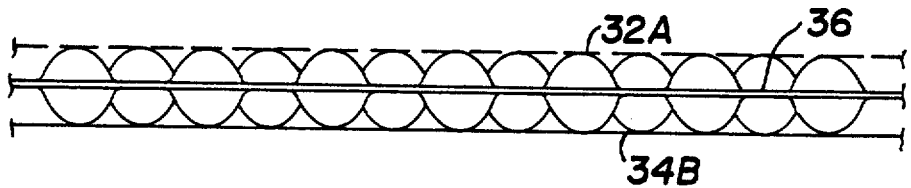

FIG. 3B shows an embodiment similar to FIG. 3A but wherein the lower film 34B is formed with semihemispherical modules which correspond to and oppose the modules in the upper film 32A. An intermediate planar film 36 may be used.

Figure 3C:
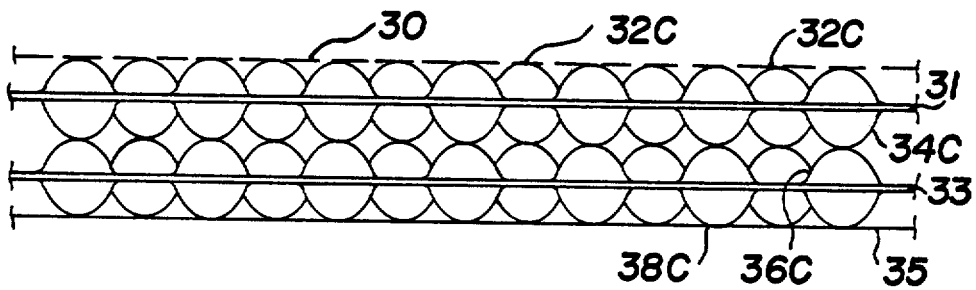

FIG. 3C shows two layers of the double semihemispherical modules or bubbles. This quilt has opposed upper bubbles 32C and 34C, and opposed lower bubbles 36C and 38C. There may be an upper protective film 30 and/or a lower protective film 35 which correspond in structure and function to the films 10 and 18 described above. The lower bubbles 34C of the upper layer are sealed to the upper bubbles 36C of the lower layer at their points of abutment.

Figure 4:
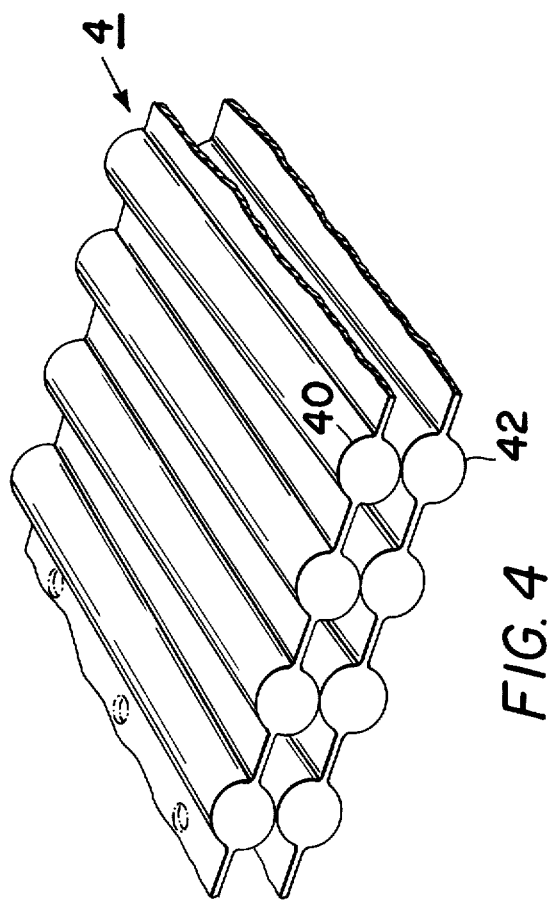
FIG. 4 is an isometric view of a solar quilt which has parallel rows of cylindrical compartments.

In the embodiment shown in FIG. 4 the quilt 4 comprises upper bubbles 40 and lower bubbles 42 which are elongated and extend the full width of the quilt. These bubbles inherently provide transverse strength so that the quilt may be relatively rigid and may be supported solely along the longitudinal edges of the quilt. When the quilt 4 is supported in this manner the various elements may, if necessary, be formed of more rigid materials and/or may include upper and lower films equivalent to films 10 and 18 in FIG. 1B.

Figures 5, 6:
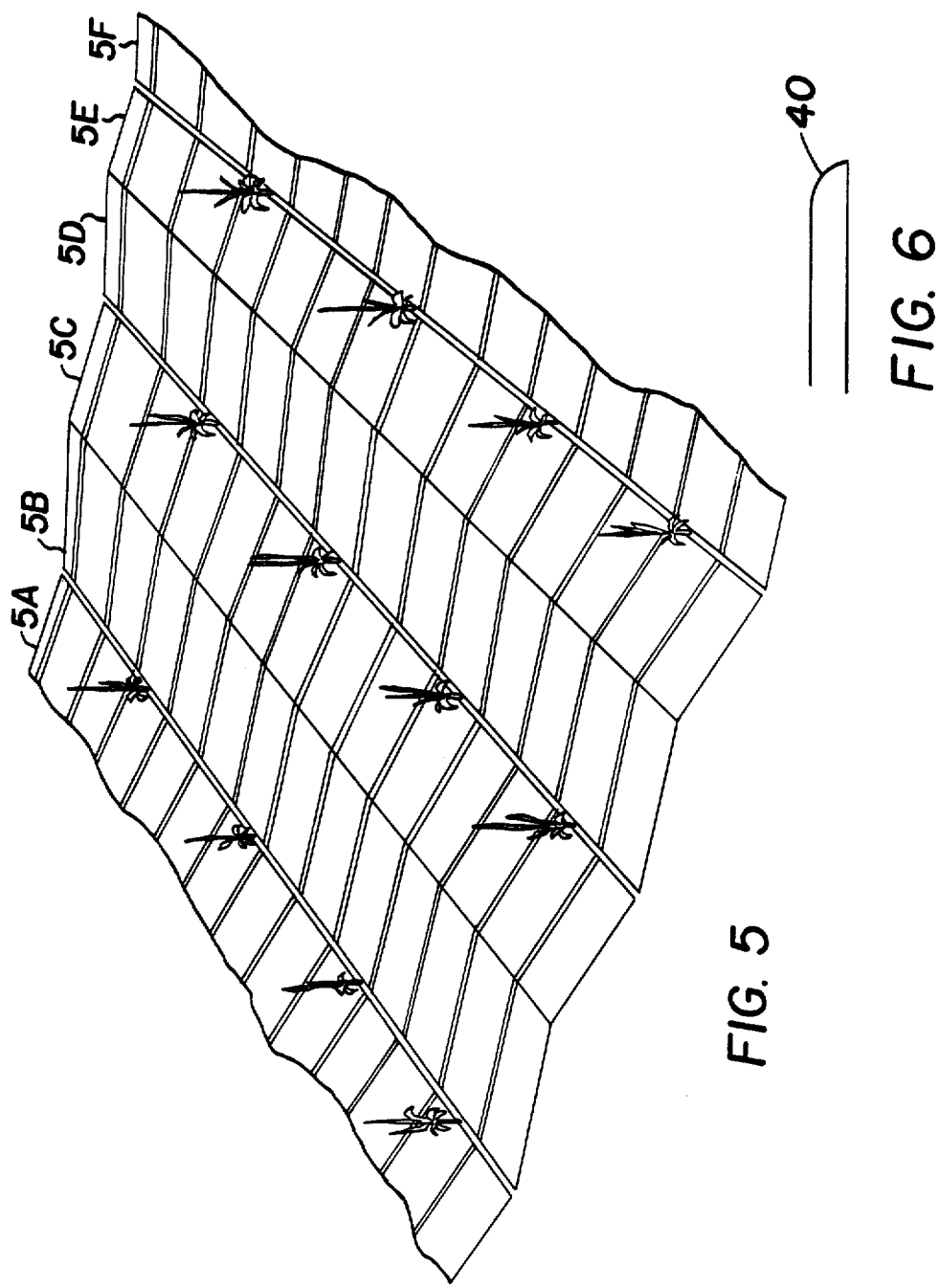
FIG. 5 is an isometric view of an agricultural use of the invention, showing plants which are growing in soil which is heated by a solar blanket, and wherein pairs of the solar blankets are used to funnel rain to the plants.
FIG. 6 shows a curved edge of a blanket providing an airfoil section.

FIG. 5 shows an example of an agricultural application of the quilt shown in FIG. 4. Rows of quilts, 5A-5F are arranged, as shown, to form troughs in which produce is planted. The quilts raise the temperature of the ground, promote more rapid growth and extend the growing season. Moreover, any precipitation and condensation from dew is directed towards the produce due to the inclination angles of the quilts.

In each of the aforementioned embodiments the perimeter of the quilt may be formed as shown in FIG. 6, with a curve 40 at its perimeter having a convex airfoil section which stabilizes the edges and creates an oblique pressure when the quilt is subjected to lateral wind movement across its surface.

The quilt may be formed in strips or in round, oval, pyramidal or rectangular sections which are suitable for use with individual and multiple seeds, plants, vines, or trees. These variations may include structural combinations of the forms shown in FIGS. 1-4. Circular quilt sections may be provided with radial surface troughs, with the junction points between the films being arranged substantially along convergent, non-parallel rows to provide a plurality of radially disposed drainage troughs. Openings and channels may be provided for control and direction of irrigation water or dew, from natural or artificial sources.

The upper halves of the individual gastight compartments may have shapes other than the sinusoidal shape shown in FIGS. 1A and 1B. For example, these upper halves may be pyramidical, hemispherical or cubic.

Also, magnification lenses may be attached to or included in the upper film 12 for concentrating solar energy on the surface of the lower film 16. These lenses may be integrally formed in the upper film, attached to the upper surface of the upper film or sandwiched between two layers thereof. The focal length of such lenses will be related to the distance between the upper and lower films 12 and 16, taking into consideration the site, latitude and relative position of the sun.

The plastic films of the solar quilt may be made from a wide variety of natural and synthetic organic polymers. The films may be selected according to the desired physical and chemical characteristics, and such selection depends in part upon their thickness, density and molecular structure. The light transmissive films 12 and 14, for example, may be made of nylon, polyethylene, polyester (Mylar), PVC, vinyl and polyolefin compounds (Cryovac). Suitable polymers for the light-absorptive and heat-transmissive films such as 16 are natural rubbers, synthetic rubbers, chlorinated polyethylene, chlorosulfonated polyethylene (Hypalon), polypropylene, nylon, PVC, ionomer (Surlyn) or Aclar which is available from Allied Chemical Corporation. As previously mentioned, additives, coatings, and/or laminates are applied to or included in the respective films to give them the desired characteristics, i.e. transparency and downward reflectivity for the upper films, and light absorptivity and thermal conductivity for the lower films. The films may also for reinforcement or other specific purposes contain additives or be associated with components which provide them with physical and chemical properties which are appropriate to the anticipated use and environment of the solar quilt. The additives and components may be in various forms including powders, threads, particles, fabrics, films, sheets and coatings. For example, the films may be provided with glass fiber reinforcement for strengthening purposes, and they may have coatings or films to control the vapors or gases within the isolated gastight compartments.

Persons familiar with the field of the invention will recognize that the invention may take many forms other than the specific embodiments described above. Therefore, it is emphasized that the invention is not limited to these specific embodiments but is embracing of a wide variety of devices which fall within the spirit of the following claims.

I claim:

1. A flexible solar quilt, comprising
   an upper film and a lower film which have therebetween a multiplicity of isolated gastight compartments, said compartments providing a thermal insulation barrier between said upper and lower films,
   said upper film being flexible and clear with a capability of high ultraviolet and infrared transmission in a downward direction, said upper film including reflective means for reflecting downwardly infrared energy impinging on the underside thereof, said reflective means comprising a layer of unidirectional light transmitting material on the lower surface of the upper film;
   said lower film being flexible and having a high light energy absorption capability, said lower film including an organic polymer and thermally conductive particles which are dispersed in the polymer to provide the lower film, through its thickness, with a thermal conductivity of at least $10.0 \times 10^{-4}$ calories/second/square centimeter/(°C./centimeter) in order to promote the transfer of heat toward an underlying medium which is to be heated,
   said lower film being formed to provide therein, in the area thereof associated with each of the isolated gastight compartments, a plurality of downwardly extending projections, said lower film having a lower surface with an area which is at least about 30% greater than the area of a plane of commensurate lateral dimensions.

2. A flexible solar quilt, comprising,
   an upper film and a lower film which have therebetween a multiplicity of isolated gastight compartments, said compartments providing permanent thermal insulation barrier spaces between said upper and lower films,
   said quilt having a flexibility which permits it to be rolled up for shipment and storage,
   said upper film being flexible and clear with a capability of high ultraviolet and infrared transmission in a downward direction, said upper film including reflective means for reflecting downwardly infrared energy impinging on the underside thereof;
   said lower film being flexible and having a high light energy absorption capability, said lower film including an organic polymer and a modifier which provides the lower film, through its thickness, with a higher thermal conductivity than the polymer in order to promote the transfer of heat through the polymer and toward an underlying medium which is to be heated,
   said lower film being formed to provide therein, in each area associated with each of the isolated gastight compartments, a plurality of downwardly extending projections;
   said lower film having a lower surface with an area which is at least about 30% greater than the area of a plane of commensurate lateral dimensions.

3. A flexible solar quilt according to claim 2 wherein the thermal conductivity of the lower film is at least $10.0 \times 10^{-4}$ calories/second/square centimeter/(°C./centimeter).

4. A flexible solar quilt as defined in claim 2 or claim 3 wherein the reflective means of the upper film for reflecting downwardly the infrared energy impinging on the underside of said film is a layer of unidirectional light transmitting material on the lower surface of the upper film.

5. A flexible solar quilt as defined in claim 2 or claim 3 wherein the modifier for enhancing the thermal conductivity of the lower film includes thermally conductive particles which are dispersed in the organic polymer of the lower film.

6. A flexible solar quilt according to claim 2 or claim 3 having at least one intermediate film located between said upper film and said lower film, said quilt having at least two layers of said isolated gastight compartments.

* * * * *